INVENTOR.
LOREN K. ARMSTRONG
BY Francis E. Blake
ATTORNEY

OPERATORS POSITION

INVENTOR.
LOREN K. ARMSTRONG
BY
Francis E. Blake
ATTORNEY

SUPERVISORY SIGNAL

Filed Oct. 25, 1954 4 Sheets-Sheet 3

INVENTOR.
LOREN K. ARMSTRONG
BY Francis E Blake
ATTORNEY

March 18, 1958 L. K. ARMSTRONG 2,827,517

SUPERVISORY SIGNAL

Filed Oct. 25, 1954 4 Sheets-Sheet 4

INVENTOR.
LOREN K. ARMSTRONG
BY
Francis E. Blake
ATTORNEY 2,827,517

SUPERVISORY SIGNAL

Loren K. Armstrong, Fairport, N. Y., assignor, by mesne assignments, to General Dynamics Corporation, a corporation of Delaware Application October 25, 1954, Serial No. 464,213
4 Claims. (Cl. 179—27)

Figure 1:
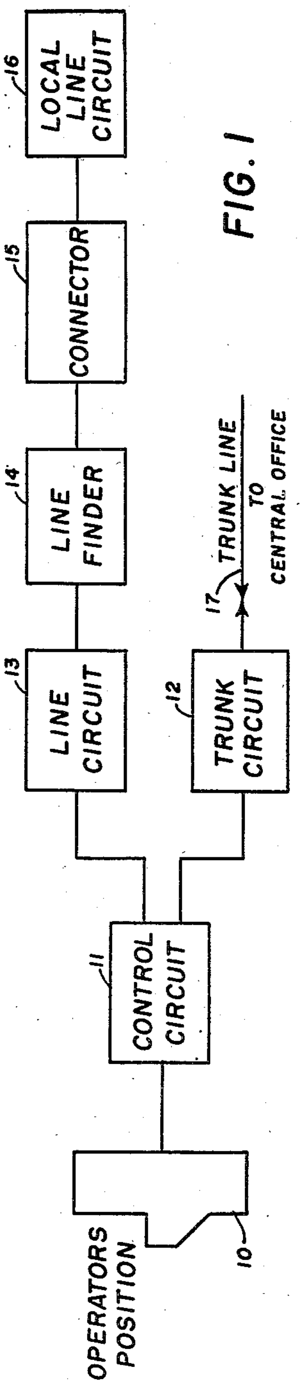

The present invention relates to telephone systems, and more particularly to an improved supervisory signal indicating system.

Telephone systems arranged to provide for trunk lines from a central office, local lines of a private branch exchange, and an operator's position for routing calls between the trunk lines and the local lines are well known. In such systems, the operator's position is sometimes provided in the form of a so-called attendant's cabinet having keys to control the answer of the call incoming from the trunk line and the extension of the call and dialing into the private branch exchange. These attendants' cabinets also customarily are provided with monitor lamps including an incoming lamp, a busy lamp, and a supervisory lamp. Previous to this invention, the supervisory lamp has been used solely to indicate the extension of the incoming call to the private branch exchange until after the desired called party in the private branch exchange has answered.

Quite often the operator at the attendant's cabinet is required to perform other duties in addition to telephone duties and sometimes these other duties interrupt the operator after an incoming call has been answered and before the call has been extended into the private branch exchange. This means that the calling party is held waiting while the operator attends to the other duties. Sometimes the operator forgets that the call from the calling party has not yet been extended into the private branch exchange and since with the prior systems only the busy lamp is illuminated after the incoming call has been answered and before the call is extended into the private branch exchange, there is no distinctive signal to indicate to the operator that the calling party is being held without extension into the private branch exchange. In other words, the busy lamp indication has been confusing to the attending operator since the indication is the same when a call between the calling party and the called party is actually in progress and when the call from the calling party has been answered by the attendant and not yet extended to the private branch exchange.

It is an object of my invention to provide a new and improved supervisory signaling system at an operator's position.

It is another object of the present invention to provide an operator's position with improved supervisory signal means having different conditions of operation effective to provide distinct signals indicative of answer of the incoming call without extension into the private branch exchange, extension of the incoming call into the private branch exchange until the called party answers, and answer of the call by the called party.

A feature of the invention in its preferred form is the provision of a supervisory lamp arranged to be dimly illuminated upon answer of the incoming call by the operator and to be brightly illuminated when the operator extends the call into the private branch exchange and until the call has been answered by the called party.

Figure 6:
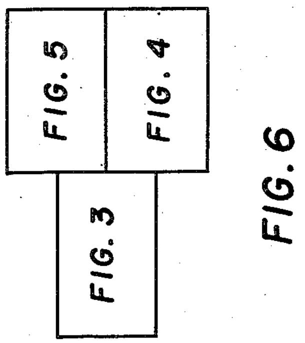
Figure 2:
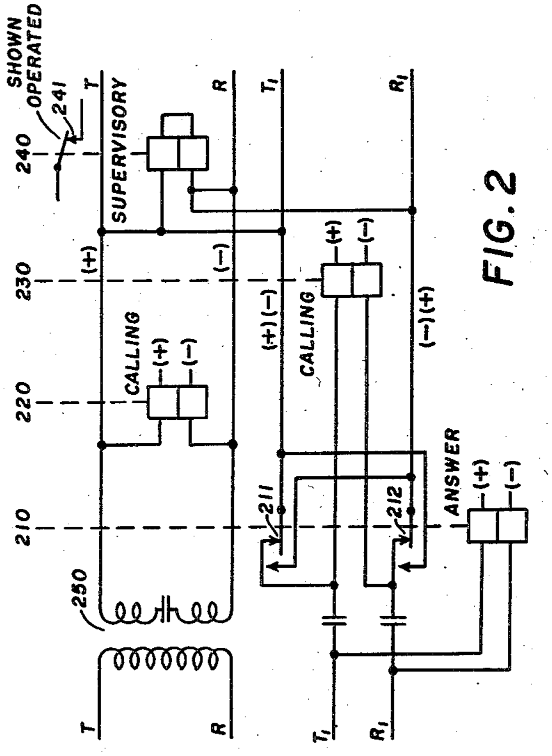
Figure 3:
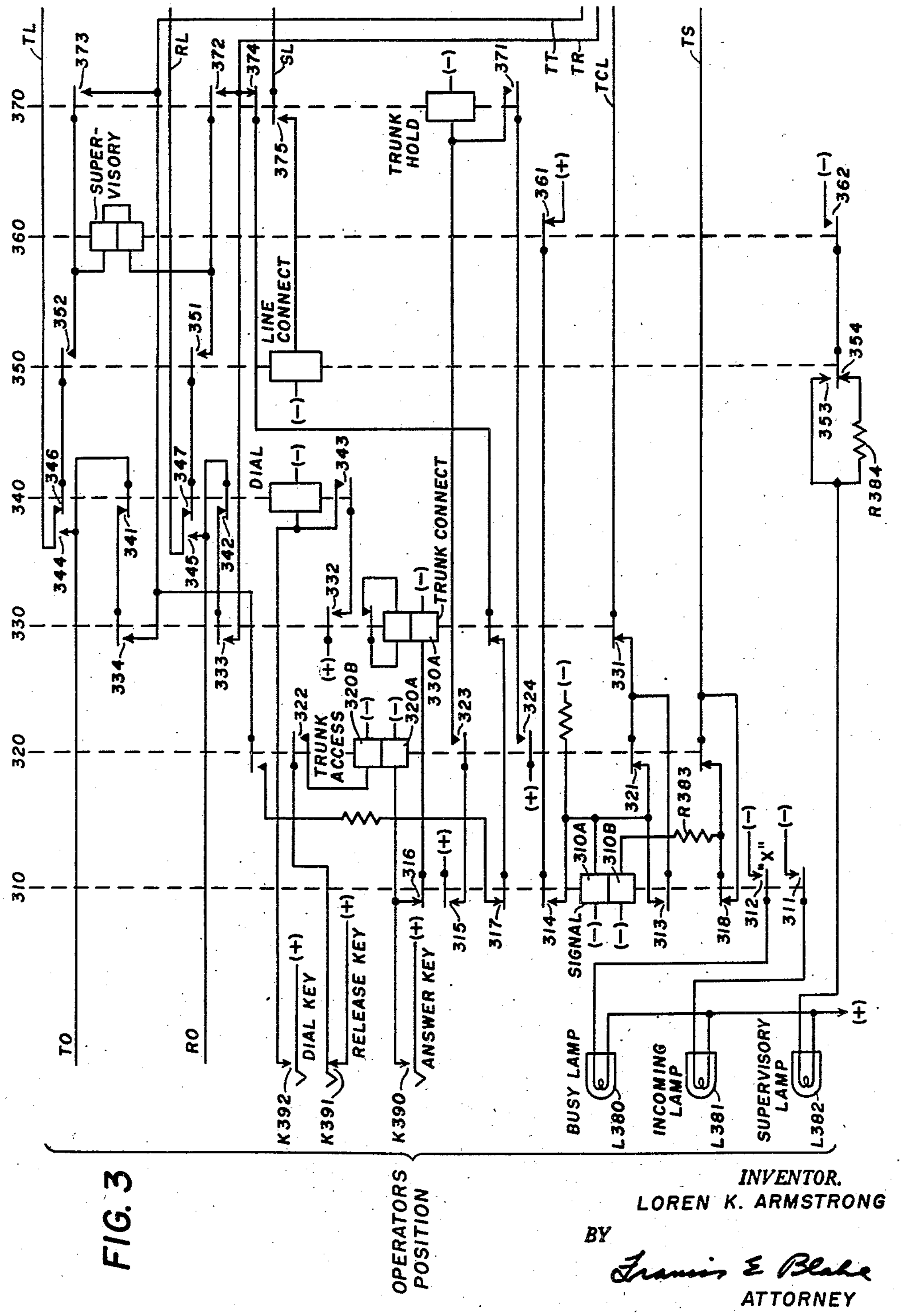
Figure 4:
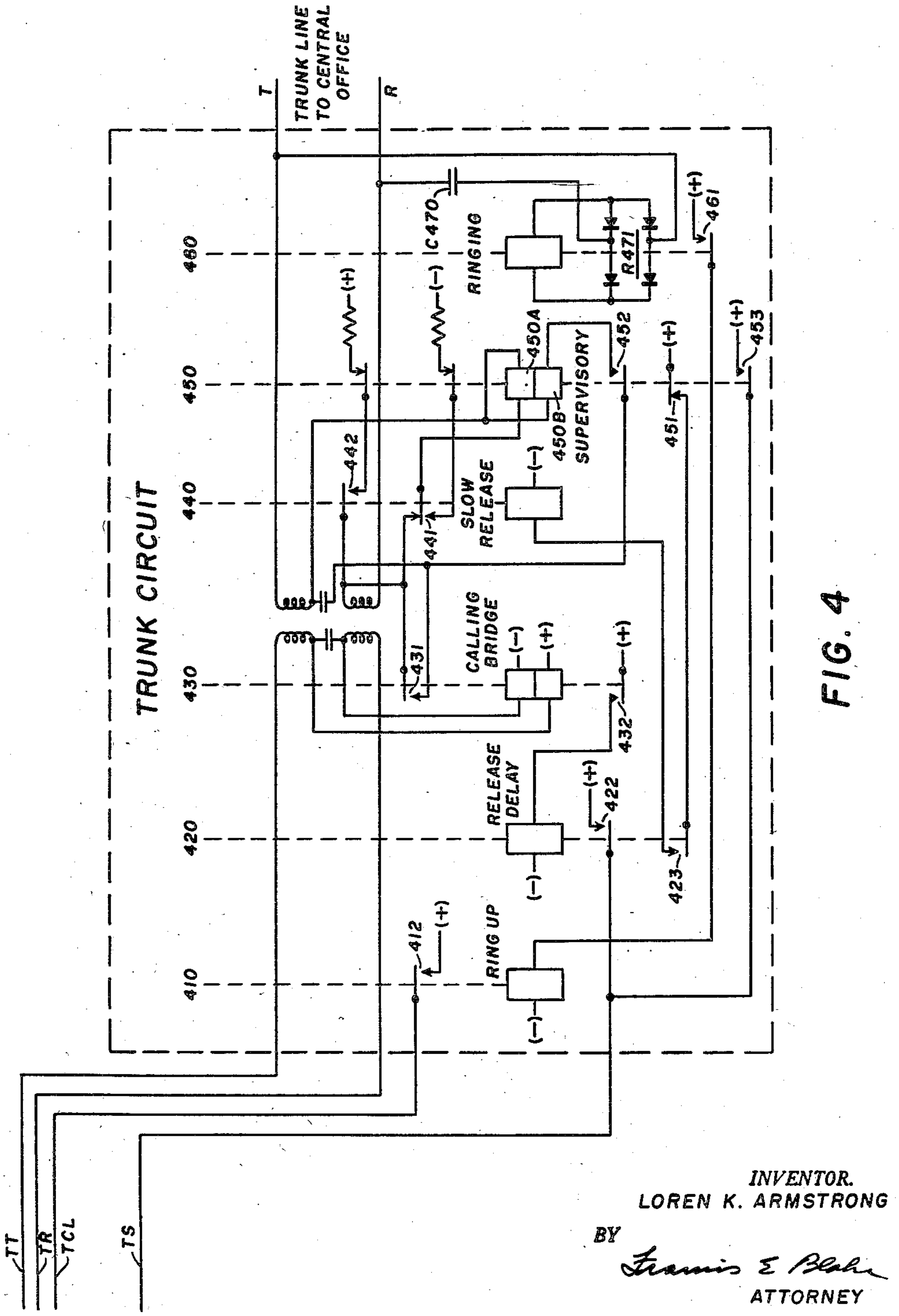
Figure 5:
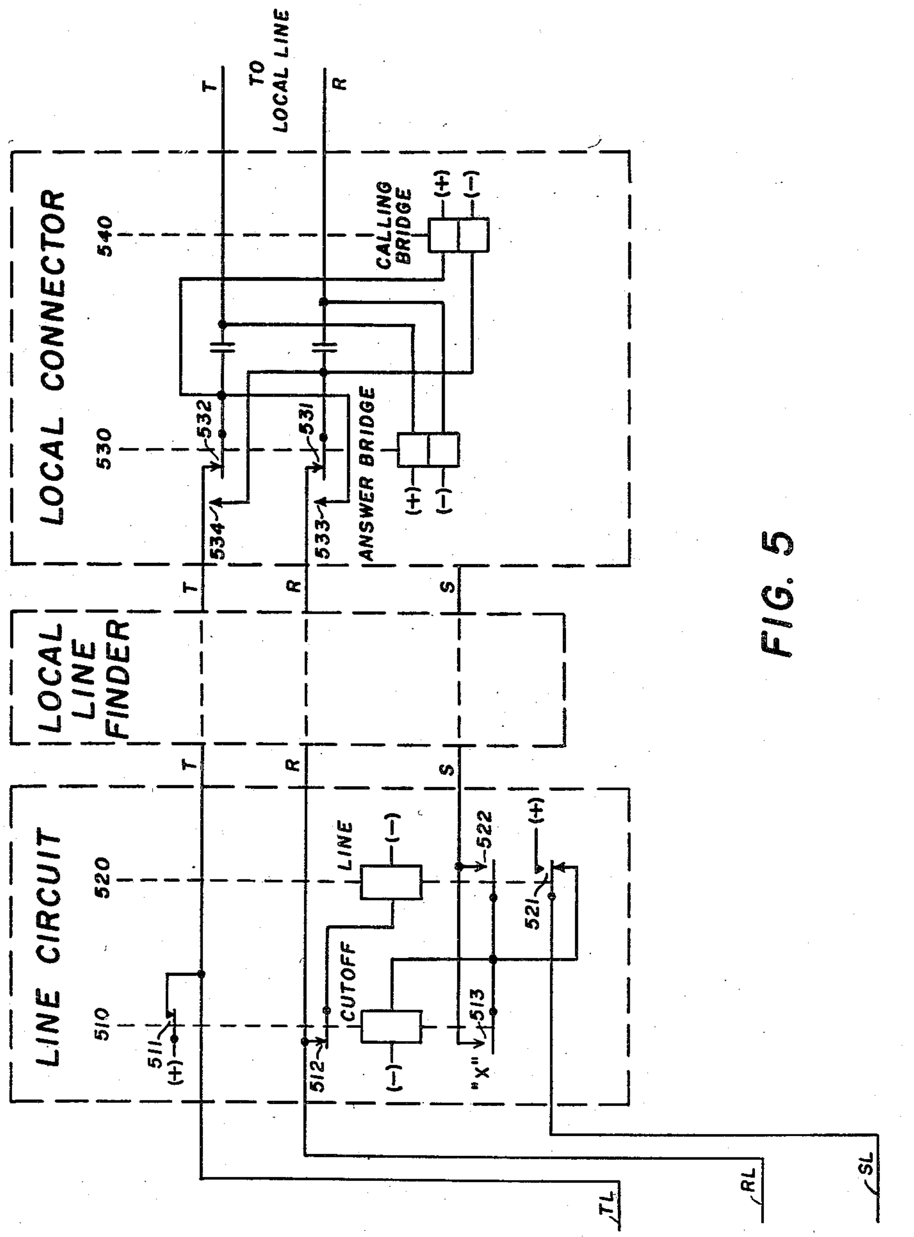

Further objects, features, and the attending advantages of the invention will be apparent with reference to the following specification and drawings in which:

Fig. 1 is a block diagram of a typical telephone system to which the invention applies, Fig. 2 is a schematic of a simplified arrangement to show the principles of operation of the supervisory relay as used to control the supervisory signal lamp, Fig. 3 is a schematic of an operator's position circuit embodying the supervisory signaling arrangement of the invention, Fig. 4 is a partial schematic of a simplified trunk circuit for connecting a trunk line from a central office to the operator's position circuit of Fig. 3, Fig. 5 shows only the essential circuit details of a local line circuit, line finder, and connector as used with the position circuit of Fig. 3, and Fig. 6 is a block diagram to show the manner of interconnecting Figs. 3–5.

An example of a typical telephone system to which the invention may be applied is shown by the block diagram of Fig. 1. An operator's position or night attendant's cabinet 10 is provided with a control circuit 11 for routing connections from the trunk circuit 12 to the line circuit 13. There may be one or more trunk circuits similar to the trunk circuit 12 for connection to an associated trunk line, such as the trunk line 17 extending to a central office, or the like (not shown). Similarly, there may be one or more line circuits similar to the line circuit 13 which is associated with line finder 14 and connector 15 of a private automatic branch exchange, or the like. In the system described, calls from the central office over the trunk line 17 are routed through the control circuit 11 to the operator's position where the call may then be extended by dialing through the same control circuit 11 to the line circuit 13 of the automatic exchange and eventually to the desired local line, such as the local line 16. As mentioned before, the present invention is concerned with improvements in the supervisory signal indicating arrangements for the operator's position 10 as controlled by the control circlit 11, to indicate the answering of a call from the trunk circuit 12 and the operator's position 10 at which time the calling party over the trunk circuit 12 is held, and to differently indicate the extension of the call from the operator's position 10 into the automatic exchange equipment including the line circuit 13, line finder 14, connector 15, and local line circuit 16.

Fig. 2 of the drawing shows a simplified schematic of the circuit for connecting the combined supervisory and control relay 240 to the tip and ring conductors T and R of the trunk circuit representing the trunk circuit 12 of Fig. 1, and to the tip and ring conductors T1 and R1 of the line circuit representing the line circuit 13 of Fig. 1. A battery feed or calling bridge relay 220 is shown to be connected to the tip and ring conductors T and R of the trunk circuit at the repeat coil 250 while a similar battery feed or calling bridge relay 230 is connected through reversing contacts 211 and 212 of the answer bridge relay 210 to the tip and ring conductors T1 and R1 of the called line. For purposes of simplicity in the present description, the combined control and supervisory relay 240 is shown to be permanently connected across both tip and ring conductors T and R and tip and ring conductors T' and R' in parallel, although it should be understood that suitable relay switch circuits are to be provided to determine the connections of the relay 240 to the respective tip and ring conductors, as will be described in more detail in connection with Figures 3–5 of the drawings. The battery feed relay 220 and the battery feed relay 230 are both normally connected to the respective tip and ring conductors T, R, and T', R', with the same polarity, such that the positive or ground polarity is connected to the tip conductor while the negative or battery polarity is connected to the ring conductor. With such connections, the supervisory relay 240 is operated by the batteries of both battery feed relays to close its contacts 241 and appropriately initiate the desired signaling. It will also be noted that both the battery feed or calling bridge relays 220 and 230 are operated by the closed loop circuit provided by the coils of the supervisory and control relay 240 so that the holding of the respective lines by the operation of their respective battery feed relays is obtained.

Assuming now that a call has been extended from the conductors T and R to the conductors T' and R' with the respective battery feed relays 220 and 230 operated together with the control supervisory relay 240, as mentioned above. When the call is answered, the answer bridge relay 210 is conventionally operated which operates the reversing contacts 211 and 212 to reverse the polarity of the connections of the battery feed or calling bridge relay 230 to the tip and ring conductors T' and R'. The polarities of the potentials supplied by the battery feed relays 220 and 230 are now opposing each other and therefore the supervisory and control relay 240 is restored since there is no appreciable potential difference across the conductors T, R, and T', R' in parallel. It is, of course, understood that the comparative impedance of the windings of the relays 220 and 230, together with the length of lines and resistance involved, should be approximately the same if the voltage across the combined control and supervisory relay 240 is to be zero. However, for all practical purposes, the voltage across the relay 240 is insufficient to maintain the operation of such relay when the polarities of connections for the calling bridge relay 230 are reversed with respect to the polarities of connections of the calling bridge relay 220 to their respective tip and ring conductors. The restoration of the supervisory relay 240 opens the signaling circuit at contacts 241 to thereby indicate answering of the call and the operation of the answer bridge relay 210, and it will be noted that the coil of the supervisory relay 240 is still connected across the tip and ring conductors T, R, and T', R' to maintain the holding loop even though the supervisory relay is now restored.

Reference is now made to Figs. 3–5 of the drawings for a detailed description of the supervisory signal indicating system of the invention. It should be understood that the trunk circuit of Fig. 4 has been simplified and that any other suitable form of trunk circuit may be used. Fig. 5 of the drawings discloses certain of the circuit details of a line circuit and a local connector interconnected through a line finder, the line finder being shown only in block outline. Again the circuit details of both the line circuit and the local connector have been simplified showing only those elements that are required for an understanding of the operation of the supervisory signaling circuit of Figure 3 wherein the operation of said signaling circuit will be described in detail.

It is believed that the description of the circuits of Figs. 3–5 may be best understood by describing the routing of an incoming call from the central office through the trunk circuit of Fig. 4 to the control circuit and operator's position of Fig. 3 and thereafter to the line circuit, local line finder, and local connector of Fig. 5 to the called line. When a call is received from a central office over the trunk line, the application of ringing voltage over the trunk line tip and ring conductors T and R causes the operation of ringing relay 460 which is connected in the conventional manner through the condenser C470 and full wave bridge rectifiers generally shown at R471. The operation of the ringing relay 460 conects ground through operated contacts 461 to energize the ring-up relay 410. The operation of the ring-up relay 410 closes contacts 412 to connect ground to the TCL lead extending to the control circuit of Fig. 3 and through normally closed contacts 331 and 321 to the coil 310A of the signal relay 310 thus operating such relay. The operation of the signal relay 310 closes contacts 311 and preliminary make contacts 312 to light the busy lamp L380 and the incoming lamp L381 thus signaling the attendant at the operator's position that an incoming call is to be received. The operation of relay 310 also closes contacts 313 to prepare a holding circuit for relay coil 310A independent of the normal contacts 321 and further closes contacts 314 to establish a holding circuit to ground for coil 310A through the normally closed contacts 361 of the supervisory and control relay 360. The operation of relay 310 also closes contacts 315 to prepare an operating circuit for the trunk holding relay 370 and opens contacts 316 to prevent the operation of the trunk connect relay 330 for the time being. The operation of the signal relay 310 also opens contacts 317 and 318 which will be later referred to in detail.

Upon noting the illumination of the busy and incoming lamps, the operator closes the answer key K390 to thereby connect ground to the operating coil 320A of trunk access relay 320, thus operating such relay, which thereby closes contacts 322 to provide a holding circuit through relay coil 320B from battery to the ground normally supplied through normally closed contacts of the release key K391. The operation of the trunk access relay 320 also closes contacts 323 to complete the operating circuit for the trunk holding relay 370 which thereupon operates and locks up through operated contacts 371 and 324 to ground independent of the operating circuit including the operated contacts 315 of the signal relay 310. The operation of the trunk holding relay 370 closes contacts 372 and 373 to connect the coils of the supervisory relay 360 across the tip and ring conductors TT and TR to the trunk circuit of Fig. 4. The operation of the trunk hold relay 370 also opens contacts 374 and closes contacts 375 to be referred to later in more detail.

With trunk hold relay 370 operated to connect the supervisory relay 360 across the tip and ring conductors TT and TR of Fig. 4, a loop circuit is closed to operate the battery feed for calling bridge relay 430 and the potential supplied through the calling bridge relay 430 from ground to tip conductor TT and through the supervisory relay 360 to the ring conductor TR and battery, also causes the operation of the supervisory relay 360 to open contacts 361 and close contacts 362. The closing of contacts 362 dimly energizes the supervisory lamp L382 through the circuit from battery through operated contacts 362, normal contacts 354, resistor R384, and lamp L382 to ground. The dim energization of supervisory lamp L382 through the circuit, above identified, provides a definite indication that the trunk circuit of Fig. 4 is being held by the supervisory control relay 360 and that as yet the call has not been extended to the private branch exchange equipment, as will be described. With supervisory relay contacts 361 open, the aforementioned locking circuit for the signal relay 310 is broken.

The aforementioned operation of the battery feed or calling bridge relay 430 closes contacts 431 to trip the ringing to the trunk line at the central office by connecting the low resistance coil 450B of the supervisory relay 450 across the trunk line conductors T and R through operated contacts 452. It should be mentioned that the supervisory relay 450 has been previously operated through its high resistance coil 450A from ground and battery on tip and ring conductors T and R supplied from the preceding connector battery feed (not shown). With relay 450 operated, ground is connected through contacts 453 to the TS lead for obtaining the partial operation of relay 310 and the illumination of the busy lamp L380 as soon as the connector seizes the trunk circuit of Figure 4, it being remembered that the holding circuit for the signal relay 310 was broken at the now operated supervisory relay contacts 361. The operation of the calling bridge relay 430 also closes contacts 432 to connect ground to operate the release delay relay 420 which closes contacts 422 to connect an additional ground to the sleeve conductor TS extending to the control circuit of Figure 3. The tripping of the ringing at the central office also restores ringing relay 460 which opens contacts 461 and the operating circuit for the ring-up relay 410 which thereupon restores to open contacts 412 and remove the operating ground on the TCL lead to the signal relay 310 of Fig. 3. With the ring-up relay 410 restored, the signal relay 310 is only partially restored since the ground on the sleeve conductor TS is then connected through normal contacts 318 and the resistor R383 to the coil 310B of the signal relay 310 which thereby maintains partial operation of relay 310 to maintain closed the preliminary make contacts 312 and thus maintain the energization of the busy lamp L380. All other contacts of the relay 310 are at this time restored to normal so that among other functions, the incoming lamp L381 is extinguished. It will be noted that at this point in the operation of the attendant's cabinet control circuit of this invention at which time the call from the trunk line has been answered but not yet extended into the private branch exchange equipment, the busy lamp is energized and the supervisory lamp is dimly energized. After the call has been extended to the private branch exchange equipment and before the call has been answered by the called party, the supervisory lamp L382 will be brightly energized in a manner to be later described in detail.

With signal relay 310 now in the partially operated condition wherein only the preliminary make contacts 312 are operated, contacts 316 return to their normally closed condition, as shown, to complete a circuit for energizing trunk connect relay 330 through relay coil 330A from battery to ground on the operated answer key K390. The operation of relay 330 closes contacts 332 to prepare a locking circuit for the dial relay 340, and also closes contacts 333 and 334 to connect the operator's tip and ring leads TO and RO through normal contacts 341 and 342 to the trunk tip and ring conductors TT and TR from the trunk circuit of Fig. 4. Thus, a talking circuit is established between the operator and the calling party over the trunk circuit. When the operator learns that the call is to be extended to the local line through the automatic equipment, including the line circuit, local line finder, and local connector of Fig. 4, the dial key K392 may be operated by the operator to connect ground to thereby operate the dial relay 340 which thereupon locks up through operated contacts 343 to ground through operated contacts 332. With the dial relay 340 operated, the operator's talk leads TO and RO are connected through operated contacts 344 and 345 to the tip and ring conductors TL and RL of the line circuit of Fig. 4. With contacts 344 and 345 operated, ground through normal contacts 511 is connected through the operator's loop circuit to normal contacts 512 and line relay 520 to battery, thus operating such relay of the line circuit to close contacts 521 and connect ground to the SL lead and to the control circuit of Fig. 3. It will be recalled that the trunk hold relay 370 has been previously operated to establish the connections to the calling party through the trunk circuit of Fig. 4 and therefore contacts 375 are closed to connect the ground on the SL lead to operate the line connect relay 350 which closes contacts 351 and 352 to prepare a circuit connecting the supervisory relay 360 across the talking conductors TL and RL of the line circuit when the operator's loop circuit across TO and RO is disconnected. The aforementioned operation of the line connect relay 350 at this time also opens contacts 354 and closes contacts 353 to then brightly illuminate the supervisory lamp L382 from ground through lamp L382, operated contacts 353 and 362 to battery. This bright illumination of the supervisory lamp L382 now distinctively signals that the call is being extended through the private branch exchange equipment and that the called party has not yet answered. The operator then proceeds to dial the call in the usual manner seizing the local line finder and local connector of Fig. 4 which returns ground on the sleeve conductor S of the line circuit, which ground is connected through contacts 522 to operate the cutoff relay 510 which is maintained operated by the circuit established through its preliminary make contacts 513. The operation of cutoff relay 510 opens contacts 511 and 512 to restore the line relay 520. With the line relay 520 restored, the ground on the sleeve conductor S is connected through preliminary make contacts 513 and normal contacts 521 to the SL conductor and the control circuit of Fig. 3 and thereby maintains the operation of the line connect relay 350 from the sleeve ground. After dialing the call, the operator may release both the dial key K392 and the answer key K390 to withdraw from the connection. At this time, however, trunk access relay 320 remains operated through its holding circuit from ground on the release key K391 but the trunk connect relay 330 and the dial relay 340 are restored. With the relays 330 and 340 restored, and the line connect relay 350 and the trunk hold relay 370 operated, the coil of the supervisory relay 360 is connected through operated contacts 351 and 352 and normal contacts 346 and 347 to the line circuit talking conductors TL and RL and also through the operated contacts 372 and 373 to the trunk circuit talking conductors TT and TR. In such manner, both the circuits of Fig. 4 and the circuits of Fig. 5 are held by the loop of the supervisory relay 360 while awaiting the answer of the call extended to the local line of Fig. 5. It has been assumed that the operator in dialing the call to the local line has completed the connection to the called line and that ringing voltage has been applied and only the answering of the call is awaited at the time the operator withdraws from the connection. Under such circumstances, the calling bridge relay 540 of the local connector is connected through normal contacts 531 and 532 to the talking conductors of the local line finder and line circuit and is operated by the loop circuit of the supervisory relay 360. It will be seen that ground polarity is applied to the tip conductor TL while battery polarity is applied to the ring conductor RL through the calling bridge or battery feed relay 540 and that such polarities of connections are the same as the polarities of connections to the battery feed or calling bridge relay 430 of the trunk circuit of Fig. 4. Thus the supervisory relay 360 and the control circuit of Fig. 3 remain operated to maintain closed contacts 362 and continue the bright illumination of the supervisory lamp L382 through both operated contacts 362 and 353, as previously described.

When the called party on the local line of Figure 5 answers, the answer bridge relay 530 is operated, as is conventional, to open contacts 531 and 532 and close contacts 533 and 534 to reverse the polarity of connections of the calling bridge or battery feed relay 540. Thus the polarities of the potentials supplied by the calling bridge relay 540 to the talking conductors TL and RL are opposed to the polarities of the potentials supplied by the calling bridge relay 430 to the trunk circuit talking conductors TT and TR and since the supervisory relay 360 is connected across both talking conductors TL, RL, and TT, TR, the potential difference across the relay 360 becomes practically zero and such relay restores. The restoration of the supervisory relay 360 opens contacts 362 to extinguish the supervisory lamp L382, thus giving the operator a third type of supervision signal to indicate that the call has been answered. Now only the busy lamp L380 remains energized to indicate a call in progress. So long as both parties remain on the line the supervisory relay will not be operated, but should the called party on the local line of Fig. 5 hang up, the supervisory relay will then again become operated by the potentials supplied by the battery feed relays 430 and 540. Tracing this circuit in detail, when the called party on the local line of Fig. 5 hangs up, the answer bridge relay 530 will be restored to re-reverse the polarity connections of the calling bridge relay 540, thus reoperating the supervisory relay 360 to close contacts 362 and again brightly energize the supervisory lamp L382. The operator upon noting the bright reillumination of the supervisory lamp L382, then momentarily operates the release key K391 to remove ground on the holding circuit 320B of the trunk access relay 320 to restore such relay which opens contacts 323 and 324 to restore the trunk hold relay 370, opening contacts 372 and 373 to break the loop circuit established by the supervisory relay 360 across the trunk circuit conductors TT and TR. The restoration of the trunk hold relay 370 also opens contacts 375 to restore the line connect relay 350 and break the loop circuit of the supervisory relay 360 across the line circuit conductors TL and RL. Thus, the calling bridge relay 430 of the trunk circuit of Fig. 4 and the release delay relay 430 of such circuit are restored and all remaining operated relays in the trunk circuit are thereafter restored in the conventional manner to release the trunk for further calls. The breaking of the loop circuit across the line circuit tip and ring conductors TL and RL by the opening of contacts 351 and 352, also restores the calling bridge relay 540 of the local connector which, through conventional circuits not shown in detail, eventually results in the removal of ground potential on the sleeve conductor S and the restoration of the cutoff relay 510. In such manner, all of the circuits are returned to normal.

In the foregoing description a bright and dim operation of the supervisory lamp L382 has been described. When an incoming call from the trunk circuit of Figure 4 is first answered by the operation of the answer key K390, relay 360 is operated to dimly illuminate the supervisory lamp L382 through operated contacts 362, normal contacts 354, and resistor R384. When the call is extended by the operator upon operation of the dial key K392, the line connect relay 350 is operated to open contacts 354 and close contacts 352 to thereafter brightly illuminate the supervisory lamp L382. The supervisory lamp L382 thereafter remains brightly illuminated until the called party answers which causes the restoration of the supervisory relay 360 to thereby open contacts 362 and extinguish the supervisory lamp L382. Obviously the relatively bright and dim conditions of operation of the supervisory lamp may be reversed without departing from the spirit of the invention. Also, other forms of signals may be used in place of the supervisory lamp as specifically described in the preferred form of the invention.

Various modifications may be made within the spirit of the invention and the scope of the appended claims.

What is claimed is:

1. In a telephone system including an operator's position, a trunk line incoming to the operator's position, an answer key at the operator's position to be operated by the operator when answering a call incoming over said trunk line, and a line outgoing from the operator's position, the supervisory signal arrangement comprising a supervisory lamp, means responsive to the operation of the answer key for energizing said lamp to provide a first degree of illumination and indicate answer of the call by the operator, and means responsive to seizure of said outgoing line from the operator's position after answer of the call incoming over said trunk line to energize said lamp to provide a second degree of illumination and thereby indicate extension of said call from said trunk line through said operator's position to said outgoing line.

2. In a telephone system including an operator's position, a trunk line incoming to the operator's position, an answer key at the operator's position to be operated by the operator when answering a call incoming over said trunk line, and a line outgoing from the operator's position, the supervisory signal arrangement comprising a supervisory lamp, means responsive to the operation of the answer key for energizing said lamp to provide a first degree of illumination and indicate answer of the call by the operator, means responsive to seizure of said outgoing line from the operator's position after answer of the call incoming over said trunk line to differently energize said lamp to provide a second degree of illumination and thereby indicate extension of said call from said trunk line through said operator's position to said outgoing line, and means responsive to answer of said call extended over said outgoing line to again differently energize said lamp to provide a third degree of illumination and thereby indicate a talking condition between said trunk line and said line.

3. In a telephone system including an operator's position, a trunk line incoming to the operator's position, an answer key at the operator's position to be operated by the operator when answering a call incoming over said trunk line, and a line outgoing from the operator's position, the supervisory signal arrangement comprising a supervisory lamp, means responsive to the operation of the answer key for weakly energizing and dimly illuminating said lamp to indicate answer of the call by the operator, and means responsive to seizure of said outgoing line from the operator's position after answer of the call incoming over said trunk line to strongly energize and brightly illuminate said lamp to thereby indicate extension of said call from said trunk line through said operator's position to said outgoing line.

4. In a telephone system including an operator's position, a trunk line incoming to the operator's position, an answer key at the operator's position to be operated by the operator when answering a call incoming over said trunk line, and a line outgoing from the operator's position, the supervisory signal arrangement comprising a supervisory lamp, means responsive to the operation of the answer key for weakly energizing and dimly illuminating said lamp to indicate answer of the call by the operator, means responsive to seizure of said outgoing line from the operator's position after answer of the call incoming over said trunk line to strongly energize and brightly illuminate said lamp to thereby indicate extension of said call from said trunk line through said operator's position to said outgoing line circuit, and means responsive to answer of said call extended over said outgoing line to deenergize and extinguish the illumination of said lamp to thereby indicate a talking condition between said trunk line and said outgoing line.

References Cited in the file of this patent

UNITED STATES PATENTS

| | | |
|---|---|---|
| 1,567,295 | Polinkowsky | Dec. 29, 1925 |
| 1,632,051 | Whitney | June 14, 1927 |
| 2,176,340 | Heisler et al. | Oct. 17, 1939 |
| 2,375,678 | Newstedt | May 8, 1945 |